United States Patent [19]

Narvaez

[11] Patent Number: 5,517,879
[45] Date of Patent: May 21, 1996

[54] SAFETY SHIELD FOR DRIVE HOUSING

[76] Inventor: Ramiro Narvaez, 211 NE. Ave. D, Seminole, Tex. 79360

[21] Appl. No.: 309,723

[22] Filed: Sep. 21, 1994

[51] Int. Cl.⁶ .................................................... F16P 1/02
[52] U.S. Cl. ..................................... 74/609; 248/292.13
[58] Field of Search ................... 74/608, 609; 248/292.1, 248/284

[56] References Cited

U.S. PATENT DOCUMENTS

| 902,635 | 11/1908 | Wowra | 248/292.1 |
| 4,630,431 | 12/1986 | Schlueter et al. | 74/608 X |
| 4,840,604 | 6/1986 | Nusbaum et al. | 74/609 X |

Primary Examiner—Charles A. Marmor
Assistant Examiner—Mary Ann Battista

[57] ABSTRACT

A safety shield assembly wherein a base member is secured to a drive housing that in turn has therewithin a rotary member, with the base member having pivotally mounted thereto a door member, and the door member is biased into a first position extending over an opening within the drive housing and arranged for manual displacement relative to the housing opening, with a spring tube captured between the door member and the base member to bias the door member over the housing opening.

3 Claims, 4 Drawing Sheets

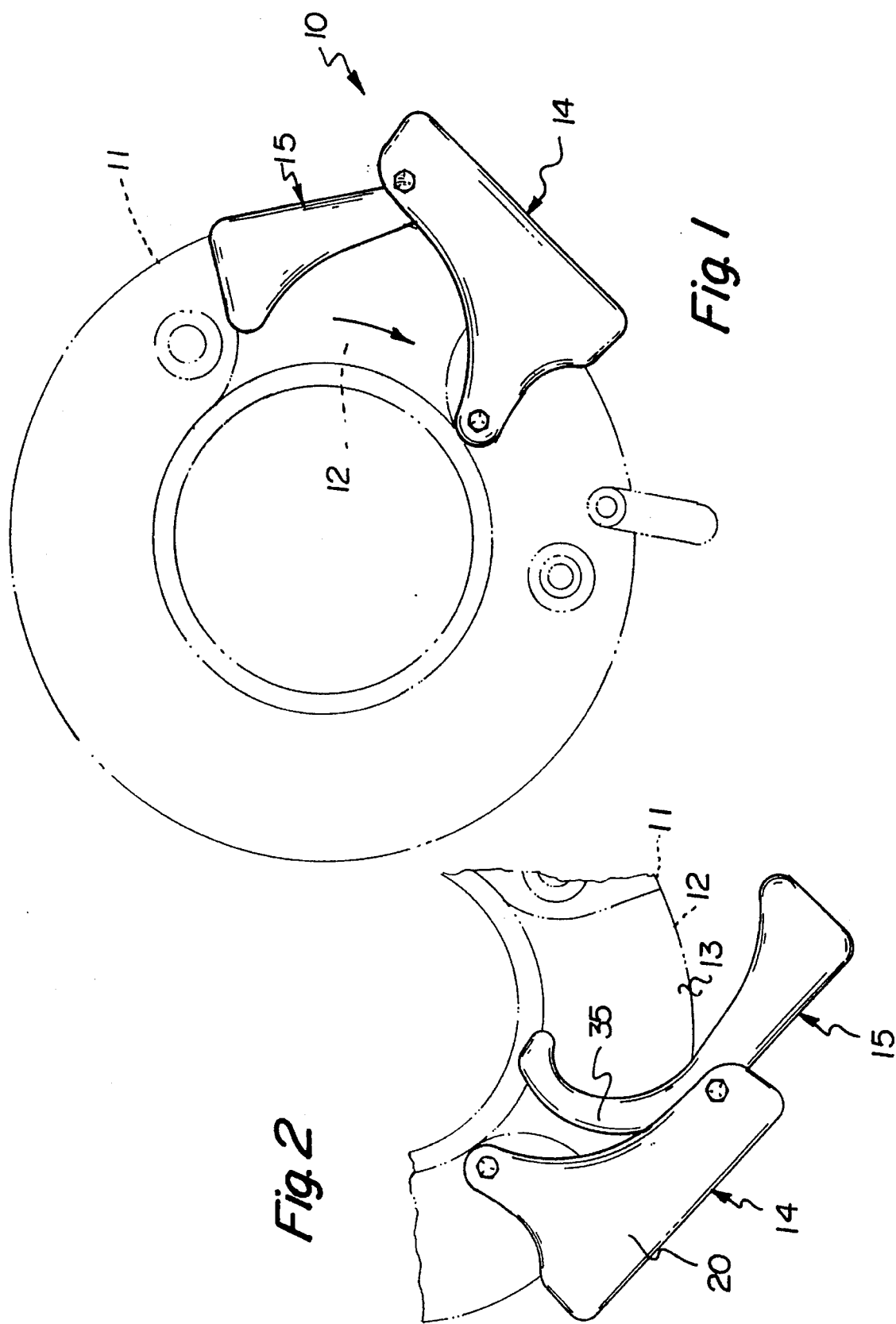

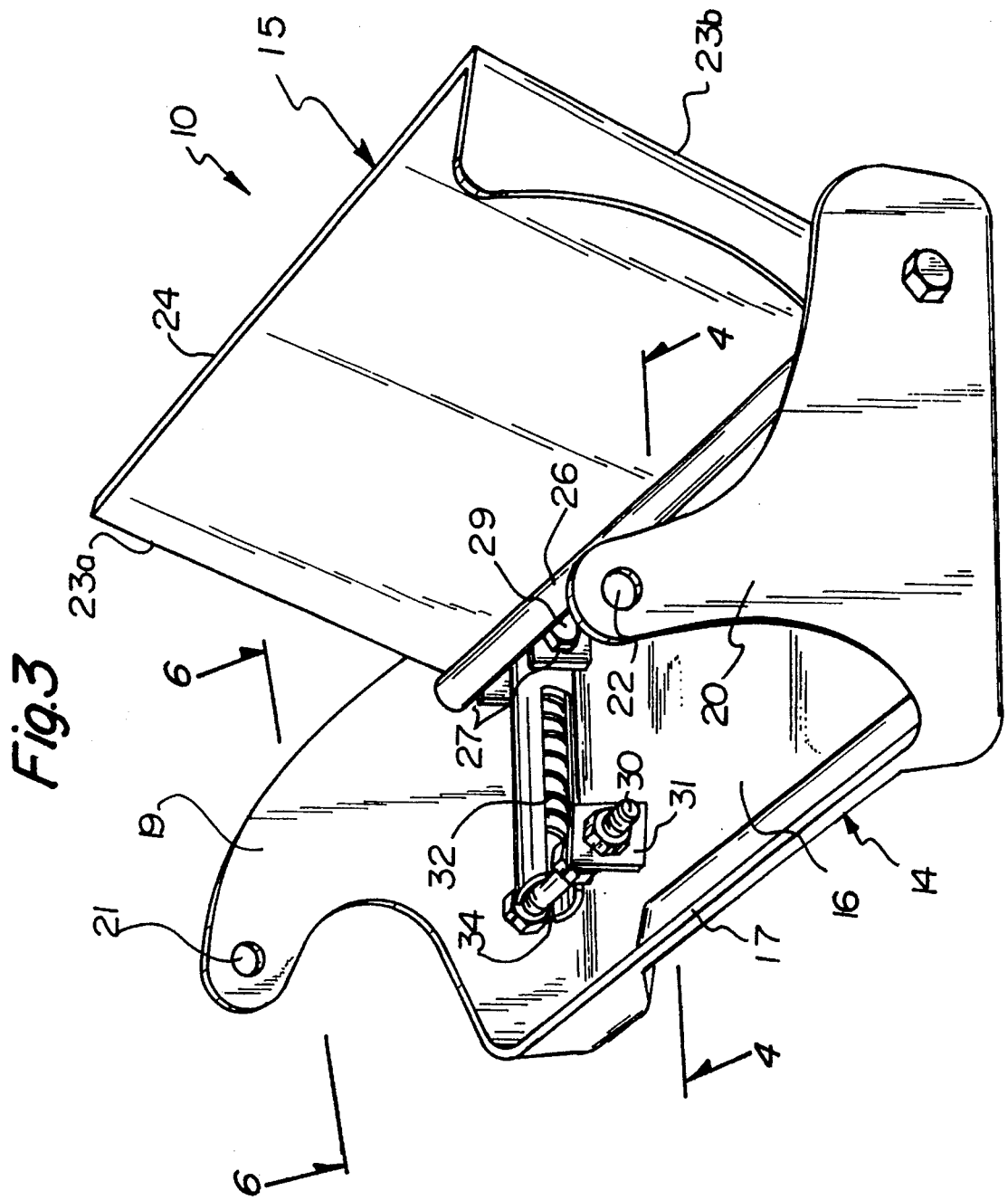

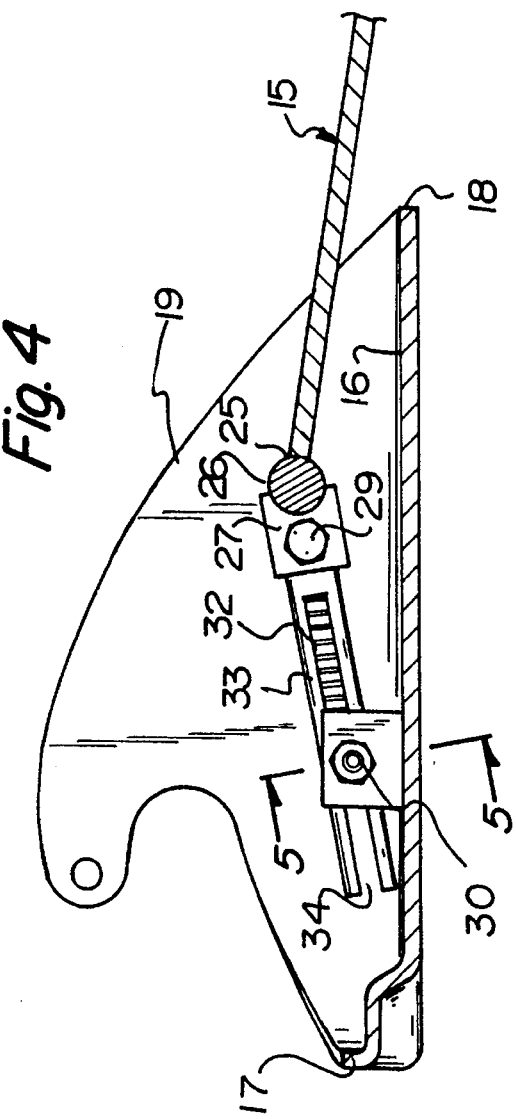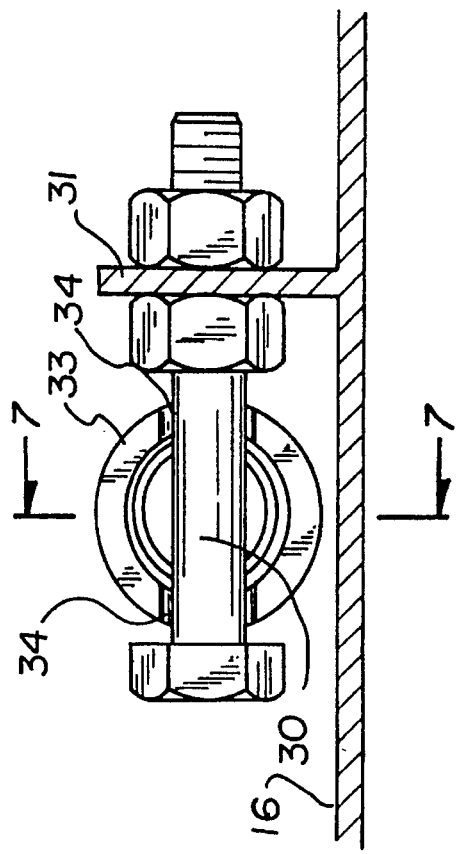

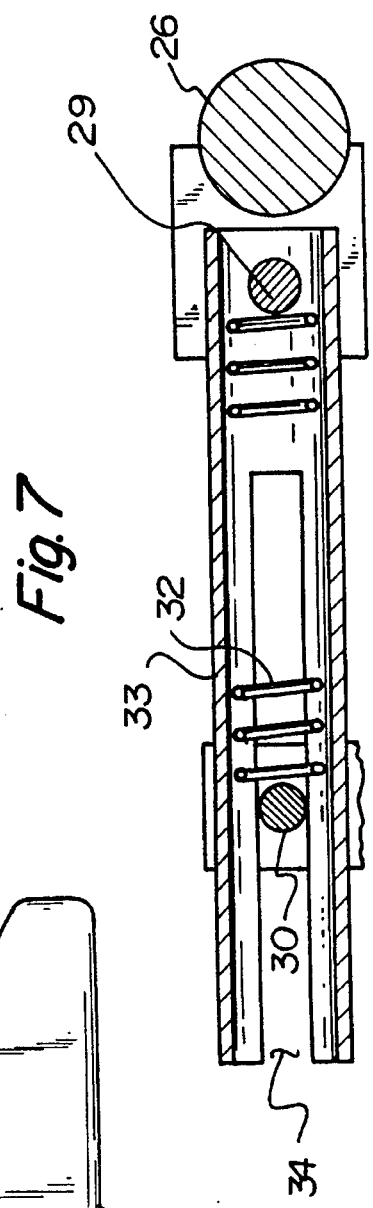
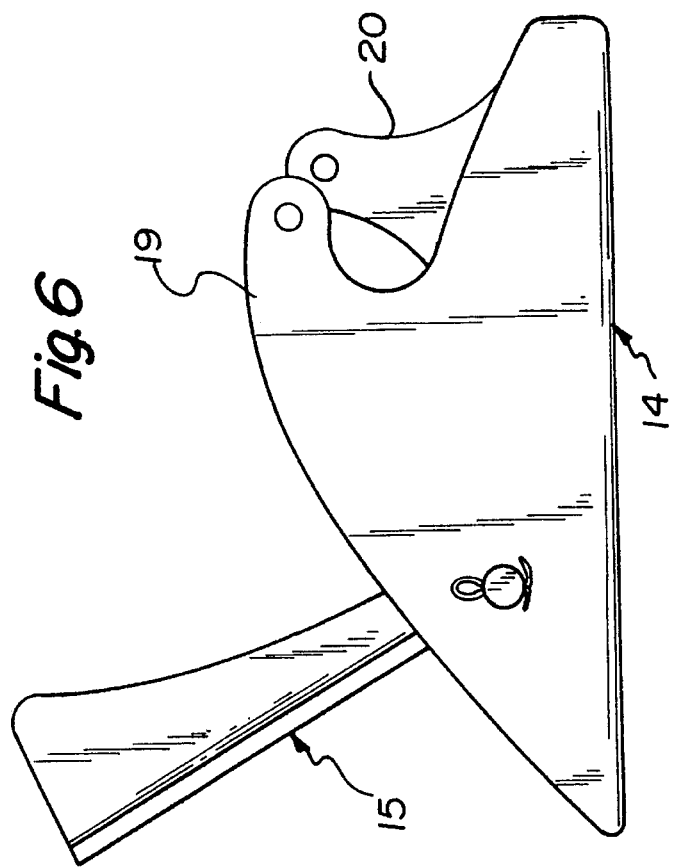

5,517,879

SAFETY SHIELD FOR DRIVE HOUSING

TECHNICAL FIELD

The field of invention relates to shield structure, and more particularly pertains to a new and improved safety shield assembly arranged to be mounted onto a drive housing containing at least one rotary member therewithin, such that the shield assembly includes a base member secured to the drive housing and a door member pivotally mounted to the base member for access to the rotary member through a housing opening within the drive housing.

BACKGROUND OF THE INVENTION

Various shield assembly structure relative to rotary members have been available in the prior art to prevent inadvertent injury to workers and the like requiring access, such that U.S. Pat. No. 4,568,313 utilizes a guard for an articulated drive shaft structure preventing components from inadvertent contact with individuals.

U.S. Pat. No. 4,324,533 sets forth a universal type guard relative to a rotary drive connected between the drive motor and a pump.

U.S. Pat. No. 3,677,520 sets forth a safety structure wherein apparatus prevents the traveling block of a drilling rig from being drawn onto the top of the rig employing a hydraulic drive arrangement.

U.S. Pat. No. 3,568,378 sets forth a guard relative to rotary hand tools and the like.

The aforenoted patents are exemplary of prior art guard structure and within this category of invention the safety shield assembly is arranged to permit securement to a housing providing selective access into that housing through a housing opening.

SUMMARY OF THE INVENTION

The present invention relates to a safety shield assembly, such that a base member has pivotally mounted thereto a door member, with the door member spring biased relative to a closed position employing an abutment leg to prevent over-travel of the door member relative to the base member.

Objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is an orthographic top view of the invention secured to a drive housing.

FIG. 2 is an orthographic view of the invention having the door member pivoted to an open orientation permitting access to a rotary member within the drive housing.

FIG. 3 is an isometric illustration of the invention.

FIG. 4 is an orthographic view, taken along the lines 4—4 of FIG. 3 in the direction indicated by the arrows.

FIG. 5 is an orthographic view, taken along the lines 5—5 of FIG. 4 in the direction indicated by the arrows.

FIG. 6 is an orthographic view, taken along the lines 6—6 of FIG. 3 in the direction indicated by the arrows.

FIG. 7 is an enlarged orthographic view of the spring tube assembly as indicated in FIG. 3.

DESCRIPTION OF THE PREFERRED EMBODIMENT

As required, detailed embodiments of the present invention are disclosed herein; however, it is to be understood that the disclosed embodiments are merely exemplary of the invention, which may be embodied in various forms. therefore, specific structural and functional details disclosed herein are not to be interpreted as limiting, but merely as a basis for the claims and as a representative basis for teaching one skilled in the art to variously employ the present invention in virtually any appropriately detailed structure.

The safety shield assembly 10 of the invention, such as indicated in FIG. 1 for example, is arranged for securement to a drive housing 11 having a predetermined length, such that with reference to FIG. 3 for example the assembly 10 is provided with a base member 14 secured to the drive housing, with a pivotal door member 15 pivotally mounted to the base member 140 The base member 14 is provided with spaced first and second flanges 19 and 20 fixedly secured at respective first and second ends of the base plate 16, such that the first and second flanges 19 and 20 are obliquely and typically orthogonally secured to the base plate 16 and spaced apart the predetermined length to accommodate the drive housing 11 therebetween. The drive housing 11 is provided with a housing opening 13, such that a rotary member 12 is rotatably directed within the housing 11, such as indicated in the FIGS. 1 and 2, wherein the assembly 10 is provided to position the door member 15 in a first closed position such as indicated in FIG. 1, but may be manually displaced therefrom by displacing the door member 15 to a second open position in configuration such as indicated in FIG. 2.

The base plate 16 is also provided with a rib 17 at a first side of the base plate 16 for abutment with the housing 11, such as illustrated in FIG. 2, with the base plate 16 provided with a base plate second side 18, as illustrated in FIG. 4. The respective first and second flanges 19 and 20 are provided with respective first and second flange openings 21 and 22 permitting fasteners and the like directed through the openings for securement to the housing 11. The door member 15 includes a door plate 23 having door plate first and second ends 23a and 23b, as indicated in FIG. 3, with the base plate 16 also configured with door plate first and second spaced sides 24 and 25. An axle 26, such as indicated in FIG. 4 for example, is fixedly secured to the door plate second side 25, with the axle as illustrated directed through the first and second flanges 19 and 20 pivotally mounting in this manner the door member 15 to the base member 14.

The axle 26 is provided with spaced axle flanges such as illustrated in the FIG. 3 for example, with a first rod 29 oriented parallel to the axle 26 directed through the axle flanges 27. A spring tube 33 has its first end secured about the first rod 29 and a second distal end of the spring tube 33 has spaced and coextensive tube slots 34 extending from the spring tube second end to slidably receive a second rod 30 therewithin. The second rod 30 is substantially parallel to the first rod 29 and in turn is secured to a base plate flange 31 fixedly secured in turn to the base plate 16. A spring 32 positioned within the spring tube 33 is captured between the first rod 29 and the second rod 30, as indicated for example in the FIG. 7, such that the door plate 23 is biased to the first position such as illustrated in FIG. 1 to overlie the housing openings 13. An abutment leg 35 secured to the door plate 23 at its second side 25, as illustrated in FIG. 2 for example, is provided optionally to engage the base plate 16 adjacent the second flange 20 to limit pivoting of the door plate 15 in the indicated first position, such as illustrated in FIG. 1. Relative to that FIG. 1, it should be noted that the base plate first side includes a rib if so desired to permit abutment with the exterior surface of the housing 11 to thereby assist in orienting the base member 14 relative to the housing 11.

It is to be understood that while certain forms of the present invention have been illustrated and described herein, it is not to be limited to the specific forms or arrangement of parts described and shown.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed and desired to be protected by Letters Patent of the United States is as follows:

1. A safety shield assembly comprising:

a base member and a door member pivotally mounted to the base member, with the base member having a base plate; the base plate having a first side spaced from a second side; a base plate first end spaced from a base plate second end; a first flange integrally secured to the base plate at the base plate first end; a second flange integrally secured to the base plate at the base plate second end; and the door member having a door plate with a door plate first end spaced from a door plate second end and a door plate first side spaced from a door plate second side; an axle fixedly secured to the door plate second side and extending through the first and second flanges spaced from the base plate; spring means secured to the axle and the base plate biasing the door plate to a first position biasing the door plate towards the first and second flanges; with the door plate arranged for displacement to a second position and displaced from the first position relative to the first and second flanges, wherein the spring means includes a spring tube, and a plurality of axle flanges secured to the axle adjacent to the first flange, and the spring tube having a spring tube first end spaced from a spring tube second end, with a first rod directed through the spring tube adjacent the spring tube first end, and the first rod oriented parallel to the axle, and the first rod directed through the axle flanges, with a second rod slidably received within the spring tube from the spring tube second end, and a spring captured between the first rod and the second rod, and the second rod secured to a base plate flange that in turn is secured fixedly to the base plate.

2. A safety shield assembly as set forth in claim 1 wherein the spring tube includes spaced tube slots diametrically aligned relative to one another and directed through the spring tube extending from the spring tube second end.

3. A safety shield assembly as set forth in claim 2 with the door plate having an abutment leg extending from the door plate for engagement with the base plate.

\* \* \* \* \*